United States Patent [19]
Grassl

[11] 4,318,587
[45] Mar. 9, 1982

[54] ELECTRICALLY ACTUATED SWITCH FOR LIGHT WAVEGUIDES

[75] Inventor: Erwin Grassl, Munich, Fed. Rep. of Germany

[73] Assignee: Siemens Aktiengesellschaft, Berlin & Munich, Fed. Rep. of Germany

[21] Appl. No.: 113,188

[22] Filed: Jan. 18, 1980

[30] Foreign Application Priority Data

Feb. 1, 1979 [DE] Fed. Rep. of Germany ....... 2903848

[51] Int. Cl.³ ............................ G02B 7/26; H01H 1/66
[52] U.S. Cl. .................................. 350/96.20; 335/154
[58] Field of Search ............... 350/96.20, 96.21, 96.22; 335/151, 152, 154

[56] References Cited

U.S. PATENT DOCUMENTS

| | | | |
|---|---|---|---|
| 4,023,886 | 5/1977 | Nakayama et al. | 350/96.20 |
| 4,146,856 | 3/1979 | Jaeschke | 350/96.20 |
| 4,152,043 | 5/1979 | Albanese | 350/96.20 |
| 4,170,731 | 10/1979 | Howell et al. | 350/96.20 |
| 4,189,206 | 2/1980 | Terai et al. | 350/96.20 |

FOREIGN PATENT DOCUMENTS 1426475 2/1976 United Kingdom ............. 350/96.20

OTHER PUBLICATIONS

S. Aoki, et al., "Paired Optical-Fiber Switch for Optical Data Bus Systems", in *Optics Letts.*, vol. 4, No. 11, Nov. 1979.

*Primary Examiner*—John D. Lee
*Attorney, Agent, or Firm*—Hill, Van Santen, Steadman, Chiara & Simpson

[57] ABSTRACT

An electrically actuated switch for opening and closing an optical connection between at least a first and second light waveguide characterized by a common basic member supported in a housing of the switch at one end with the remaining portion of the member being free of the housing, a mobile switching blade supporting one of the waveguides being mounted on the basic member, a fixed support for the other waveguide being mounted on the member and an electrical coil being positioned to create a magnetic field to change the position of the switching blade between a rest and a second position to open and close the connection between the two waveguides. Preferably, the electrical coil telescopically receives a coil member which has an internal surface for mounting the one end of the common basic member which is preferably a one piece member. The mounting of the basic common member reduces the influence of thermal stresses and external forces on the parts which stresses or forces might change or shift the accurate position of the end faces of the light waveguides which are to be coupled to one another in the switching operation.

4 Claims, 1 Drawing Figure

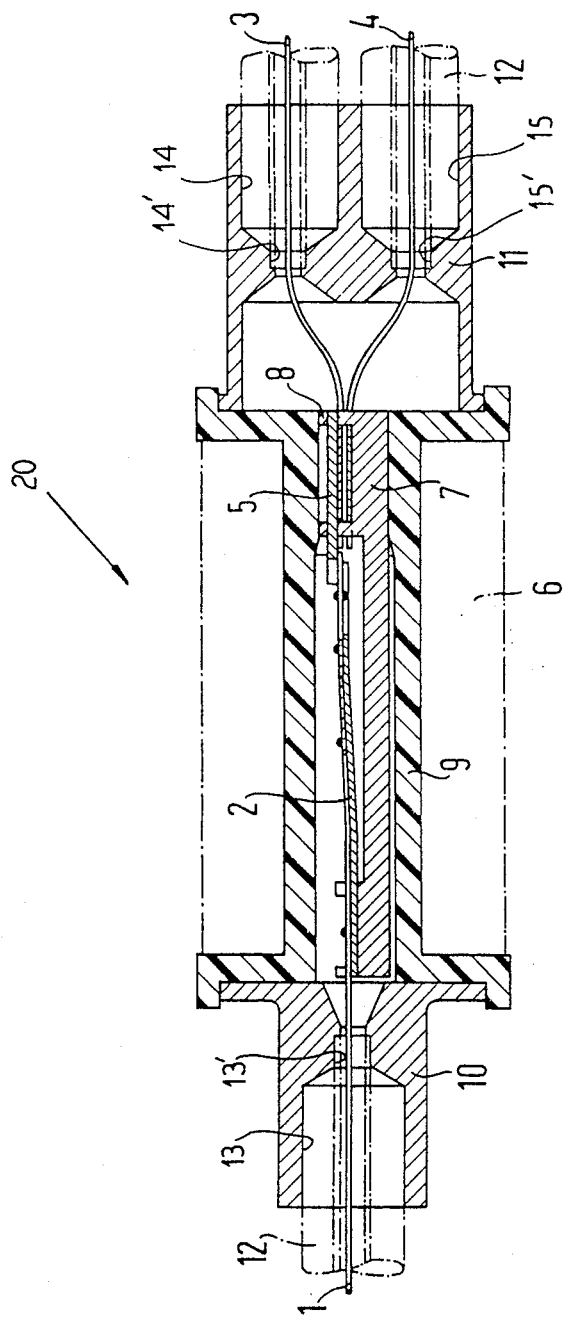

ELECTRICALLY ACTUATED SWITCH FOR LIGHT WAVEGUIDES

BACKGROUND OF THE INVENTION

The present invention is directed to an electrically actuated switch for at least two light or optical waveguides which has one of the waveguides supported on a mobile switching tongue or blade which is moveable between a rest and second position and the other waveguide supported in a fixed position with its end face aligned with the end face of the one waveguide as the blade assumes one of the two positions. The switch includes an electrical coil which creates a magnetic field to shift the tongue between the rest and second position to open and close the connection between the light waveguides.

In the case of the coupling two light or optical waveguides, it is important that the two end faces of the light waveguides are centered relative to one another as precisely as possible. The light conductive core diameter of the light waveguides, which are usually optical fiber waveguides, is relatively small so that any lateral offset leads to a considerable attenuation of the light signal that can be transmitted between the two waveguides.

A switch has been proposed for light waveguides in which a switching tongue or blade supports one of the light waveguides or fibers and the other light waveguide or optical fiber is supported on a stationary member which is arranged in the housing and the switch also includes an electrical coil. An example of such a switch is disclosed in a copending U.S. patent application of Gerhard Winzer, U.S. Ser. No. 071,118 filed Aug. 30, 1979, which is based on German patent application No. P 28 41 140.7.

During a switching on of the current, in a switch of this type, the coil will become heated due to its considerable electrical resistance. A danger does exist which danger is that a thermal distortion will occur in the switch which is composed of various parts. This thermal distortion can cause the switching tongue or blade and the fixed guide path for the other fibers to become displaced relative to one another. Such a displacement between the fixed guide path or support and the switching blade can cause a lateral offset of the facing end surfaces of the light waveguides which will cause an enlarged coupling attenuation.

SUMMARY OF THE INVENTION

The present invention is directed to providing an electrically actuated switch for optical or light waveguides in which a thermal distortion is largely avoided and in which external influences are kept remote from the switching blade and guide path which support the optical waveguides.

To accomplish these tanks, the present invention is directed to an improvement in an electrically actuated switch for opening and closing an optical connection between at least a first light conducting waveguide with a first end face and second light conducting waveguide with a second end face, said switch including a mobile switching blade supporting the first waveguide in a housing with its end face being adjacent the free end of the blade, means, which include an electrical coil, for changing the magnetic field to move the free end of the blade from a rest position to a second position) and means for supporting the second waveguide with the second end face adjacent and aligned with the first end face when the blade is one of said rest and second positions to form an optical connection and the end faces are out of alignment to open the connection between the two waveguides when the blade is in the other of said rest and second positions. The improvement comprises a common basic member, said mobile switching blade and said means for supporting the second waveguide being secured on the common basic member and means engaging one end of the basic member to mount the basic member in the housing with the remaining portion of the basic member being free of engagement with the housing.

The mounting length of the common basic member, which is engaged, is so short that the basic member cannot become distorted, warped or buckled by the action of forces. At the same time, however, the fixed relationship between the switching tongue or blade and the means for supporting the second waveguide will remain unchanged. A lateral offset of the end faces due to the influence of external forces is thus largely eliminated. The extensive mechanical isolation between the common basic member and the remaining switching parts; however, also has the advantage that the switching tongue or blade and the means for mounting the second optical fiber can be precisely positioned relative to one another prior to assembly of the basic member in the switch without any position deviations occuring during the assembly steps.

According to an embodiment of the invention, the basic member is a one piece member. Thus, it is possible to expose the basic member to the action of heat without it becoming distorted, warped or buckled. In the case of a composite basic member which consists of different materials, there would be the risk due to the inhomogeniety of the materials of distortion or stresses which would occur due to the thermal loading or heating.

According to another embodiment of the invention, the basic member with the switching blade and the means for supporting the second waveguide are arranged in the interior or the electrical coil which is mounted on a cylindrical coil member. The means for mounting the basic member comprises an interior surface of the coil member which receives the basic member so that the basic member with the switching blade and the means for mounting the second light waveguide are arranged within the coil and are substantially free from engagement with the coil member. Through the arrangement of the basic member in the interior of the coil, the coil member simultaneously becomes the switch housing. This makes it possible to have a very simple, space and cost savings construction for the switch. The mounting of the basic member at one end of the coil member eliminates the possible influences of thermal distortion or warping.

According to a further embodiment of the invention, mounting means for plug type connector parts are provided on each end of the coil member for purposes of connecting light waveguides into the switch arrangement. Through the securing of the plug type connector parts directly or indirectly on the coil member, the position of the light waveguides ends relative to one another can also be free from any alteration which would be created by external forces.

In accordance with another embodiment of the invention, other mounting means are provided on the ends of the coil member. These mounting means engage the protective sheavings or outer jackets of the light waveguide which are connected to the switch. Here also, the relative position of the switching blade to the fixed guide path of the means for mounting the second waveguide cannot be altered by the influence of the tensile forces applied to the outgoing light waveguides.

BRIEF DESCRIPTION OF THE DRAWINGS

The FIGURE is a longitudinal cross section of a switch in accordance with the present invention.

BRIEF DESCRIPTION OF THE PREFERRED EMBODIMENTS

The principles of the present invention are particularly useful in an electrically actuated switch generally indicated at 20 in the FIGURE. The switch 20 is designated as a change over switch, which enables alternately connecting a first or mobile light waveguide 1 with either a second stationary light waveguide 3 or a third stationary light waveguide 4.

As illustrated, the mobile light waveguide 1 is mounted on a mobile switching blade or tongue 2 with its end face being adjacent the free end of the blade. The second and third stationary light waveguides 3 and 4 are supported in the switch by means for supporting the waveguides in fixed guide paths. As illustrated, the means for supporting the fixed light waveguide 3 includes a magnetic tongue or blade member 5, which overlaps a portion of the free end of the switching blade 2, which as illustrated has its free end bearing against the blade 5. In this connecting position, the two end faces of the first or mobile light guide 1 and the stationary second light waveguide 3 are in relative alignment.

The switching blade 2 and the magnetic blade 5, which are illustrated in a coupling position, are magnetized by a magnetic field created by the electrical coil 6 which holds the switching tongue 2 against its resilient forces on the fixed or stationary magnetized tongue 5. When the electrical coil is deenergized, the switching blade 2 due to its resilient force will shift away from the magnetic blade 5 and assume a rest position. In the rest position, the end face of the light waveguide 1 carried by the blade 2 will be aligned with the end face of the stationary third light waveguide 4, which is mounted in another stationary guide path on a common basic member 7.

The switching blade or tongue 2 is mounted with one end being secured to one end of the basic member 7, which is preferably a one piece member, and the free end of the blade extends towards the other end of the member 7. In a similar manner, the fixed magnetic blade 5 is mounted adjacent the other end of the basic member 7 with its free end pointing towards or projecting to be engaged by the free end of the switching tongue 2. As illustrated, both the blades 2 and 5 are secured on the basic member 7 by means for holding which comprise lugs or projections 8.

The coil 6 is supported on a coil member 9 which has a cylindrical portion of two internal diameters. The coil member 9 forms the major portion of the housing for the switch 20 and telescopically receives one end of the common basic member 7 in the smaller internal diameter portion so that the remaining part of the basic member 7 with the switching blade 2 is free of engagement with the housing formed by the coil member 9. To fixedly connect the basic member 7 and the coil member 9 together, a cement may be utilized.

During energizing of the coil 6, the heating, which occurs therein, may distort or warp the coil member 9; however, this thermal distortion will have a minimal effect on the basic member 7 due to the short clamping length. Thus the position of the various light waveguide end faces of the switch will not be altered.

At both ends of the coil member 9, mounting means including a member 10 at one end and a member 11 at the opposite end are provided. The mounting means 10 has a bore 13 for telescopically receiving an outer sheath or protective jacket 12 for the optical fiber forming the waveguide 1. In a similar manner, the member 11 has a bore 14 for the outer jacket or sheath of the optical fiber forming the waveguide 3 and a bore 15 for the outer jacket or sheath 12 for the optical fiber forming the waveguide 4. Each of these sheaths or outer jackets, which are illustrated in dot dash lines, can be connected in the respective bores by a cement. Due to the fastening of the outer jacket in the respective bores, an external force, which is applied on the outer jacket of any one of the waveguides, will not disrupt or dislocate the end face of the respective light waveguides 1, 3 or 4.

In addition to the bore 13, the member 10 has a concentric inner bore 13', which may receive a plug in connection part for an optical waveguide to connect it to the switch. In a similar manner, the member 11 has a smaller bores 14' and 15' which are concentric with the bores 14 and 15 and are adapted to receive plug in connection parts. If desired these parts may be secured into the bores 13', 14' and 15' by cement.

Although various minor modifications may be suggested by those versed in the art, it should be understood that I wish to embody within the scope of the patent granted hereon, all such modifications as reasonably and properly come within the scope of my contribution to the art.

I claim:

1. In an electrically actuated switch for opening and closing an optical connection between a first light conducting waveguide with a first end face and at least a second light conducting waveguide with a second end face, said switch including a mobile switching blade supporting the first waveguide in a housing with its end face being adjacent the free end of the blade, means, which include an electric coil being mounted on the housing, for changing the magnetic field to move the free end of the blade from a rest position to a second position, and means for supporting the second waveguide with the second end face adjacent and aligned with the first end face when the blade is in one of said rest and second positions to form an optical connection and the end faces are out of alignment to open the connection between the two waveguides when the blade is in the other of said rest and second positions, the improvements comprising a common basic member comprising a one piece member, said mobile switching blade and said means for supporting the second waveguide being secured to said one piece common basic member, and means for engaging one end of the basic member to mount said basic member in the housing with the remaining portion of the basic member being free of engagement with said housing.

2. In an electrically actuated switch according to claim 1, wherein the housing includes a coil member, said electrical coil being telescopically received on the coil member, and said means for engaging one end of the basic member comprises an interior surface of the coil member receiving the one end of the basic member so that the basic member with the switching blade and the means for mounting the second light waveguide are arranged within said coil.

3. In an electrically actuated switch according to claim 2, wherein said coil member at each end has mounting means for receiving plug type connecting parts for the purpose of connecting light waveguides into said switch.

4. In an electrically actuated switch according to claim 2, wherein mounting means for engaging an outer protective jacket of a light waveguide and mounting the light waveguide on the switch therewith are provided at each end of the coil member.

* * * * *